United States Patent [19]

Etherington

[11] Patent Number: 5,332,247
[45] Date of Patent: Jul. 26, 1994

[54] ARTICULATED JOINT
[75] Inventor: Michael Etherington, Abingdon, Va.
[73] Assignee: Dosco Overseas Engineering Ltd., Notts, England
[21] Appl. No.: 54,150
[22] Filed: Apr. 27, 1993
[51] Int. Cl.⁵ .......................... B60D 1/01; B62D 12/00
[52] U.S. Cl. .................................... 280/400; 280/408; 180/134
[58] Field of Search ............... 280/400, 408, 442, 426; 198/303; 180/134; 403/70, 71, 119, 52; 384/542

[56]  References Cited
U.S. PATENT DOCUMENTS

| | | | |
|---|---|---|---|
| 2,674,364 | 4/1954 | Cartlidge | 198/96 |
| 2,690,834 | 10/1954 | Lundquist | 198/109 |
| 3,100,563 | 8/1963 | Biedess | 198/124 |
| 3,557,937 | 1/1971 | Kahre | 198/109 |
| 4,031,997 | 6/1977 | Nelson | 198/301 |
| 4,160,619 | 7/1979 | Nelson | 414/501 |
| 5,044,858 | 9/1991 | Scott et al. | 414/10 |
| 5,253,727 | 10/1993 | Etherington et al. | 180/134 |

OTHER PUBLICATIONS

Joy Manufacturing Co., "Conveyor Assembly" Drawing No. JCM729-4 List of Parts as shown on JCM729-4.

Primary Examiner—Margaret A. Focarino
Assistant Examiner—Kevin Hurley
Attorney, Agent, or Firm—Webb, Burden, Ziesenheim & Webb

[57] ABSTRACT

An articulated joint for pivotally connecting adjacent sections of a vehicle. The joint includes a first slewing ring and a second slewing ring and each slewing ring has an outer member connected to an inner member. A bearing race is located between the outer member and the inner member to permit relative rotation of the members. The outer member of each slewing ring is constructed for connection to one section of a vehicle and the inner member of each slewing ring is constructed for connection to another section of the vehicle. Location sleeves are located radially inwardly of the inner members of the slewing rings and a shim is located between the ends of the location sleeves.

11 Claims, 5 Drawing Sheets

ARTICULATED JOINT

BACKGROUND OF THE INVENTION

1. Field of the Invention

The invention relates generally to an articulated joint for connecting two sections of a vehicle, and in particular to an articulated joint for use in connecting sections of a vehicle which must negotiate short radius turns. An articulated joint according to the invention may be used as a vertical pivot joint in a mine shuttlecar having a plurality of pivotally connected sections.

2. Description of the Prior Art

Articulated joints for use in vehicles are known in the art. Most vehicles also include horizontal pivot joints which permit the vehicle to operate on undulating surfaces. In vehicles with vertical pivot joints, the loading on the joint is generally low since the joint is normally located between the cab portion of the vehicle and the load carrying portion of the vehicle.

U.S. Pat. No. 4,160,619 discloses a vertical pivot joint which is located in the middle of a mine shuttlecar. The pivot joint in that patent has spaced upper and lower plates on a first section of the shuttlecar which are pivotally connected to spaced upper and lower plates on a second section of the shuttlecar. The pivotal connection incorporates bearing races, which are spaced apart to accommodate a pair of steering rams between them. Because of the spacing size and type of the bearing races, the joint cannot withstand high loads.

SUMMARY OF THE INVENTION

The invention is directed to an articulated joint for pivotally connecting adjacent sections of a vehicle such as a mine shuttlecar. The joint includes upper and lower slewing rings, each of which includes an outer annular member and an inner annular member with a bearing race located between the two annular members. The inner and outer annular members of each slewing ring are connected and each outer annular member is connected to one section of the vehicle and each inner annular member is connected to a second adjacent section of the vehicle. The connection of the outer annular members of the slewing rings to one section of the vehicle and the connection of the inner annular members of the slewing rings to a second section of the vehicle permits the vehicle sections to rotate relative to each other about a substantially vertical axis.

An annular cylinder is welded to the upper and lower plates of one section of the vehicle and a coaxial inwardly extending annular tongue is welded to the inner surface of the cylinder. The tongue is formed with a plurality of circumferentially spaced threaded blind bores extending parallel to its central axis in the upper surface and in the lower surface. The outer annular member of each slewing ring is secured to the tongue by bolts passing through circumferentially spaced apertures in the outer annular member of the slewing ring into aligned threaded blind bores in the tongue.

A second section of the vehicle has two vertically spaced substantially parallel horizontally extending upper and lower plates which receive a portion of the annular cylinder and the attached tongue between them. Each plate has an annular ring welded thereto and the inner member of each slewing ring is connected to an annular ring of the second section of the vehicle by a plurality of circumferentially spaced vertical bolts. A flanged location sleeve is also connected to each annular ring by the vertical bolts. The bolts pass through a plurality of circumferentially spaced through apertures in the flange of the location sleeve and thread into threaded blind holes in the inner members of the two slewing rings. Both of the flanged location sleeves are L-shaped and the horizontal flange of each L-shaped location sleeve contacts the outer surface of a ring attached to a plate. The two flanged location sleeves are connected by circumferentially spaced bolts.

The upper run of a chain-type conveyor is movable across the upper surface of the articulation joint. The return run of the conveyor passes below the articulation joint.

A complete understanding of the invention will be obtained from the following description when taken in connection with the accompanying drawings wherein like reference characters identify like parts throughout.

BRIEF DESCRIPTION OF THE DRAWINGS

FIG. 1b is a schematic elevation of the shuttlecar shown in FIG. 1a;

DESCRIPTION OF A PREFERRED EMBODIMENT

Figure 1A:
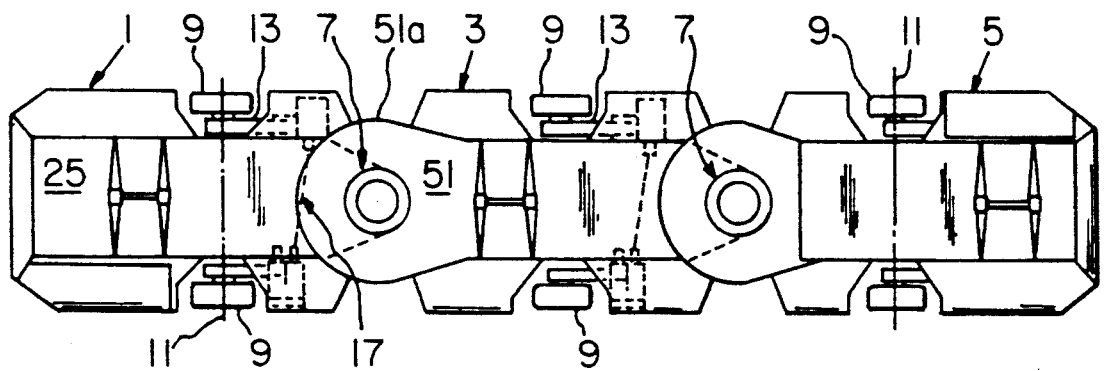
FIG. 1a is a schematic plan view of a shuttlecar having three sections connected by two articulated joints.
Figure 1B:
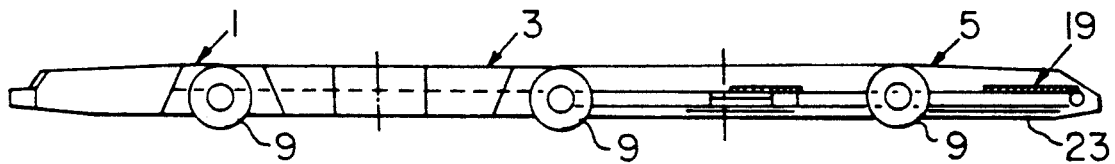
Figure 1C:
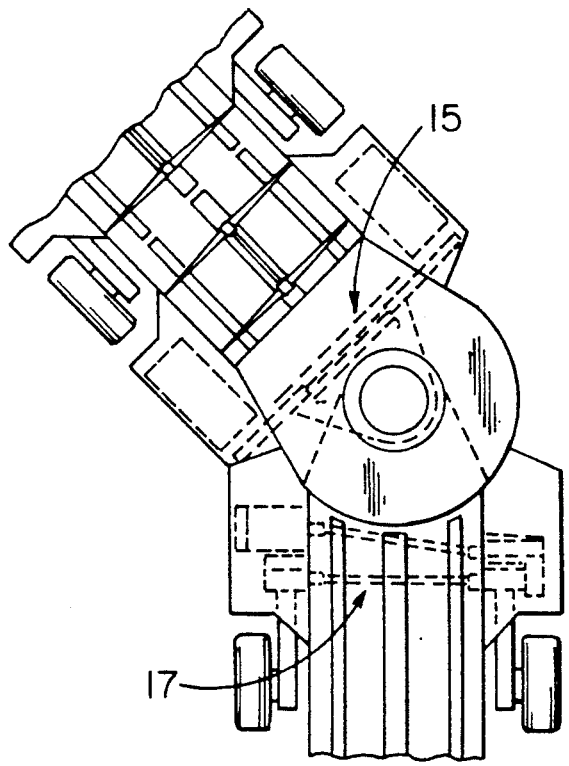
FIG. 1c is a plan view showing two connected sections of a shuttlecar in a turning mode.

FIGS. 1a–1c of the drawings show a shuttlecar having a center section connected to two end sections by articulated joints. The shuttlecar is the subject of co-pending U.S. patent application Ser. No. 07/906,577, filed Jun. 30, 1992. The shuttlecar has end sections 1 and 5 pivotally connected to a center section 3 by articulated joints 7 of the present invention. Each section 1, 3 and 5 has a pair of laterally spaced ground engaging wheels 9 and end sections 1 and 5 are divided into vertically movable portions by a horizontal pivot joint 11, the longitudinal axis of which corresponds generally with the rotation axis of wheels 9 for that section of the shuttlecar. Each wheel 9 is rotatably supported on the free end of a trailing arm 13 of a bell crank which is pivotally connected to the frame of that section of the shuttlecar by a suspension system which is the subject of co-pending application Ser. No. 08/054,630, filed Apr. 29, 1993.

An endless chain-type conveyor 19 has an upper run passing over the upper surface of the shuttlecar from end to end and a lower return run 23 passing along the underside of the shuttlecar as shown schematically in FIG. 1b of the drawings. The conveyor has a plurality of spaced transverse flight bars as is well-known to those skilled in the art.

Figure 2:
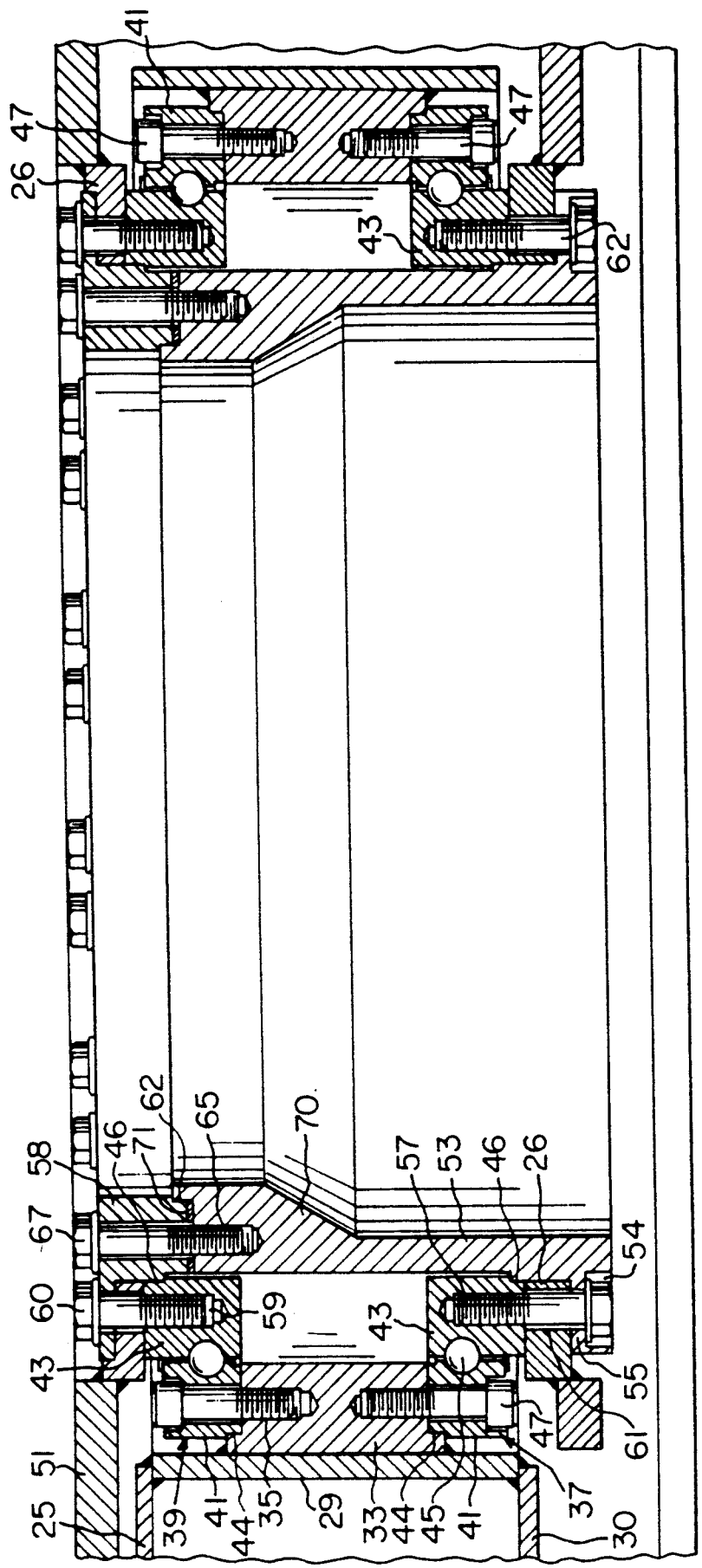
FIG. 2 is a longitudinal section through an assembled articulated joint.

The articulated joint is described hereinafter with reference to FIGS. 2 and 3 of the drawings. Referring specifically to FIG. 2 of the drawings, an annular vertical cylinder 29 has a portion of its upper edge welded to the edge of an upper plate 25 of shuttlecar section 1. A portion of the lower edge of annular vertical cylinder 29 is welded to the edge of a bottom plate 30 which is spaced from and substantially parallel to upper plate 25. An annular tongue 33 is welded to the inner surface of annular vertical cylinder 29 approximately equidistant from the upper and lower edges of the annular vertical cylinder. The tongue is provided with a plurality of circumferentially spaced axially extending threaded blind bores 35 in the upper and lower horizontal surfaces.

When articulated joint 7 is assembled as shown in FIG. 2 of the drawings, the outer annular member 41 of an upper slewing ring 39 is supported on the upper surface of tongue 33 and the outer annular member 41 of a lower slewing ring 37 abuts the lower surface of tongue 33. An annular step 44 is formed in each outer slewing ring 41 to engage the edge of tongue 33 to prevent lateral movement of the slewing ring and eliminate shear load on bolts 35. An inner annular member 43 of each slewing ring is rotatably connected to outer annular member 41 of the slewing ring by a plurality of circumferentially spaced ball bearings 45 located between the outer periphery of inner annular member 43 and the inner periphery of outer annular member 41. Outer annular member 41 of each slewing ring has a plurality of circumferentially spaced through bores 42 formed therein which correspond in size and spacing to threaded blind bores 35 in tongue 33. Slewing rings 37 and 39 are held in assembled relationship with tongue 33 by bolts 47 passing through the apertures in the outer annular member of each slewing ring into a threaded blind bore 35 in tongue 33.

Inner annular member 43 of each slewing ring is connected to a horizontal annular ring 26 which is welded to deck 51 of center section 3 of the shuttlecar, a part of which is shown in FIG. 2 of the drawings. The deck 51 of center section 3 has a circular nose portion with an arcuate edge 51a as shown in FIG. 1a of the drawings. A lower annular flanged location sleeve 53 is located radially inwardly of inner members 43 of each slewing ring and fits into an annular step 46 in the inner member of the lower slewing ring. A plurality of circumferentially spaced downwardly opening recesses 54 and through bores 55 are formed in the outwardly extending radial portion of lower annular flanged location sleeve 53. Through bores 55 are aligned with through bores 61 in lower annular ring 26. A plurality of circumferentially spaced threaded blind bores 57 are formed in the inner member 43 of lower slewing ring 37 and are aligned with bores 61. Bolts 62 extend through bores 55 and 61 and are threaded into blind bores 57. An upper annular flanged location sleeve 58 is formed with a plurality of circumferentially spaced through bores 63 located in the outwardly extending radial flange and having the same spacing as threaded blind bores 59 in inner annular member 43 of upper slewing ring 39. Upper annular flanged location sleeve 58 is connected to inner member 43 of upper slewing ring 39 by bolts 60 which are threaded into blind bores 59 in upper slewing ring 39 and an annular step 46 receives an annular lip on the location sleeve.

The outer circumferences of lower and upper annular flanged location sleeves 53 and 58 are slightly smaller than the inner circumference of inner annular members 43 of upper and lower slewing rings 37 and 39. The upper edge of an enlarged annular upper portion 70 of lower annular flanged location sleeve 53 is provided with a plurality of circumferentially spaced axially extending threaded blind bores 65, the circumferential spacing of bores 65 corresponds with the spacing of through bores 63 in upper annular flanged location sleeve 58 to enable upper annular flanged location sleeve 58 to be connected to lower annular flanged location sleeve 53 by elongated bolts 67. An annular step 62 in upper annular flanged location sleeve 58 receives the edge of an upwardly extending protrusion on lower annular flanged location spacer sleeve 53. As shown in FIG. 2 of the drawings, the upper face of the inner member of upper slewing ring member 43 is in contact with the lower face of upper ring 26 and the lower face of the inner member of lower slewing ring 37 abuts the upper face of lower ring 26. The lower surface of the radially extending portion of upper annular flanged location sleeve 58 is supported against the upper surface of upper ring 26 and the lower surface of the radially extending portion of lower annular flanged location sleeve 53 is supported against the lower surface of lower ring 26.

Figure 3:
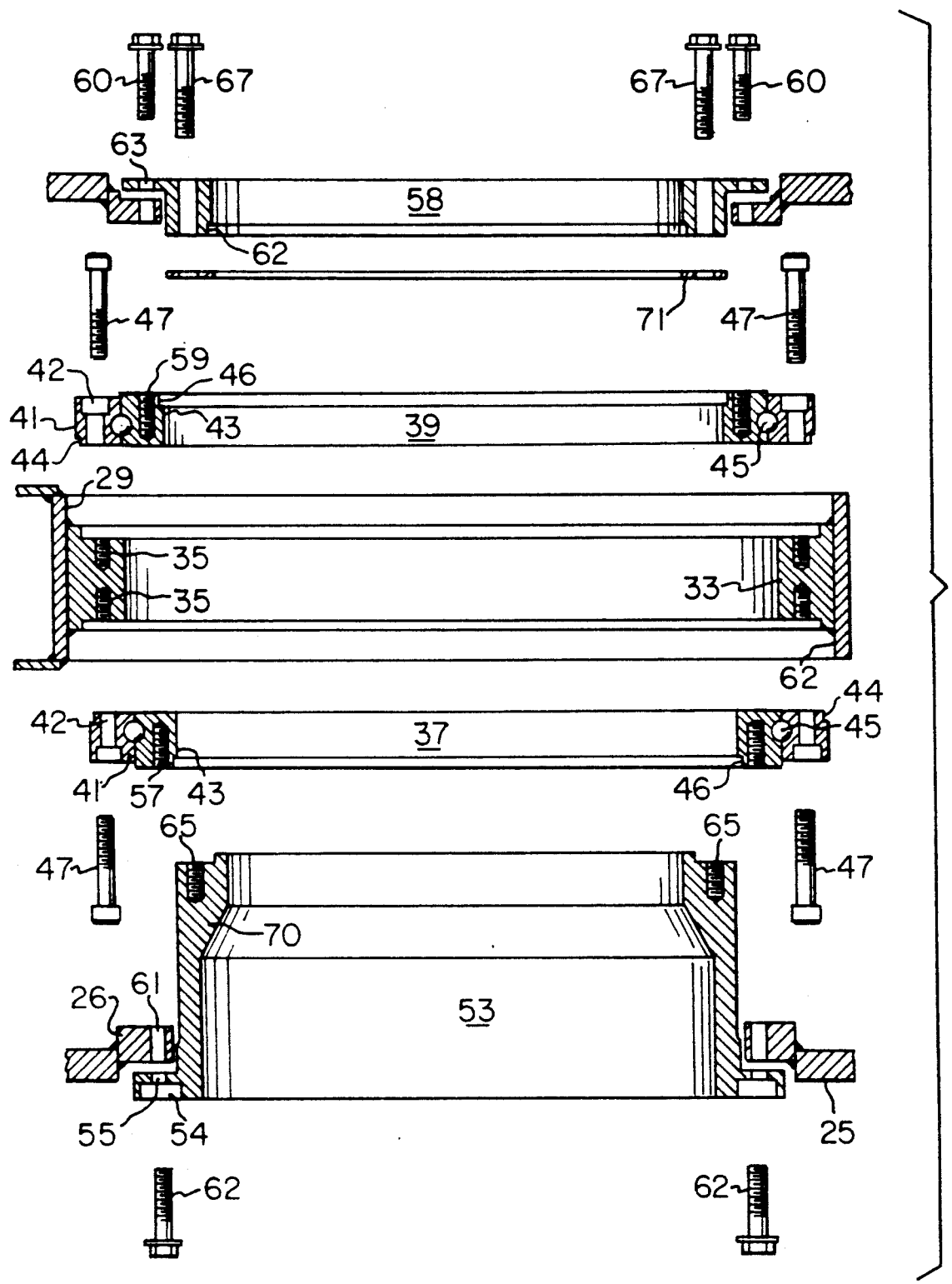
FIG. 3 is an exploded vertical section through the articulated joint shown in FIG. 2.
Figure 4:
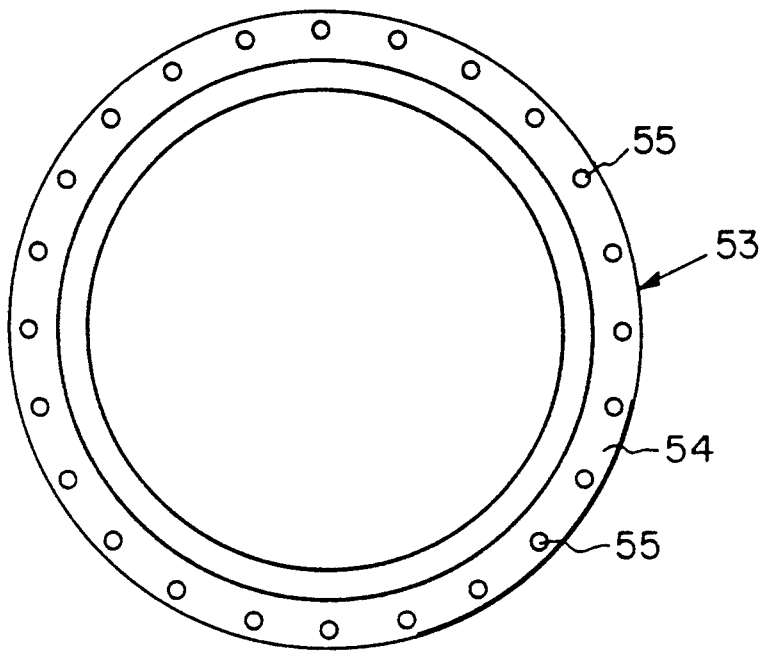
FIG. 4 is a bottom view of a lower spacer member.
Figure 6:
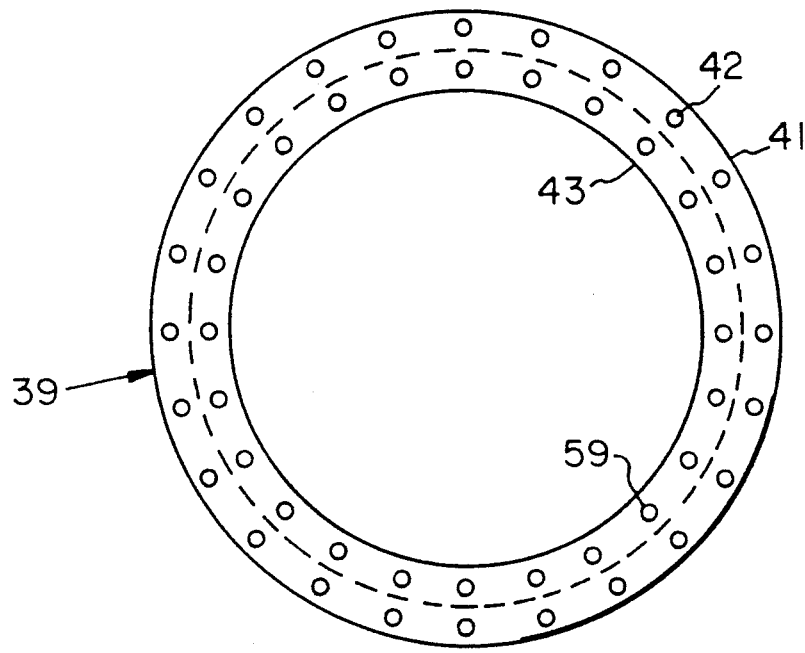
FIG. 6 is a plan view of a slewing ring.
Figure 5:
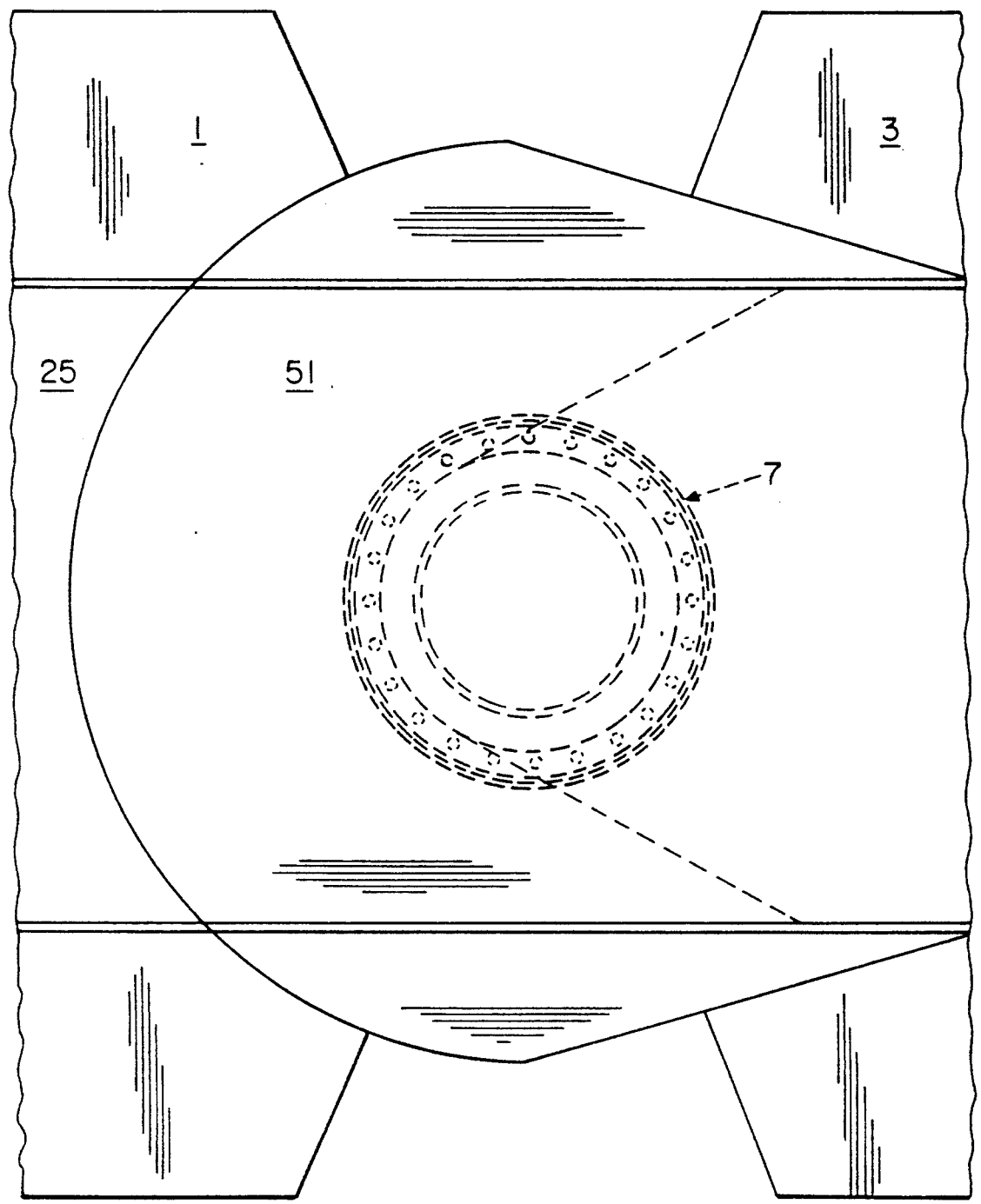
FIG. 5 is an enlarged broken plan view of two sections of a shuttlecar connected by an articulated joint.

As also shown in FIGS. 2 and 3 of the drawings, an annular shim 71 may be placed between the lower end of upper flanged location sleeve 58 and the upper annular end of lower annular flanged location sleeve 53. The annular shim is formed with circumferentially spaced through bores which are aligned with the through bores in upper annular flanged location sleeve 58 and the threaded blind bores 65 in lower annular flanged location sleeve 53. It will be understood by those skilled in the art that the thickness of the shim 71 which is located between lower and upper annular flanged location sleeves 53 and 58 will vary depending upon the dimensions of the assembled components.

The annular steps 44, 46 and 62 insure the vertical alignment of the inner and outer members of the slewing rings and thereby eliminates misalignment of the bearing races caused by tolerances in bearing and mainframe manufacture. The elimination of misalignment prevents the bearings from binding or being subject to excessive preload which accelerates the wear on the bearing races. The annular steps 44, 46 and 62 maintain the bearings in position so that the center line of the blind bores in the inner member of each slewing ring and the center line of the through bore in the outer member of each slewing ring are substantially parallel.

As shown in FIG. 2 of the drawings, spaced plates 25 and 30 of shuttlecar section 1 together with annular vertical cylinder 29 provide one half of articulated joint 7 whereas upper deck 51 and the substantially parallel lower plate of section 3 form the other half of articulated joint 7. When the articulated joint is assembled, one half of the joint fits within the other half of the joint and the outer members of the two slewing rings are firmly connected to one section of the shuttlecar and the inner members of the two slewing rings are firmly connected to the other section of the shuttlecar. This arrangement creates a substantially rigid articulated joint incorporating the spaced slewing rings.

One or more brackets (not shown) are connected to the outer surface of a portion of annular vertical cylinder 29 and a pair of steering chains pass between the brackets and have ends connected to the outer periphery of annular vertical cylinder 29. The opposite end of each steering chain is connected to a steering plate which is movable by extensible and retractable means secured to shuttlecar section 3 so that extension and retraction of the means cause the steering chains to apply a moment arm to annular vertical cylinder 29 to cause rotation of the joint to steer the shuttlecar. The steering arrangement is the subject of co-pending application Ser. No. 07/906,577, filed Jun. 30, 1992.

While a specific embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

I claim:

1. An articulated joint adapted to pivotally connect two adjacent sections of a vehicle, said joint comprising an upper slewing ring and a lower slewing ring, each of said slewings rings having an outer annular member and an inner annular member connected to said outer annular member, a bearing race located between said outer annular member and said inner annular member of each of said slewing rings to permit relative rotation of said outer and inner annular members of said slewing rings, means for connecting said outer annular member of each of said slewing rings to one section of a vehicle including an annular vertical cylinder attached to said one section of said vehicle and a substantially horizontal radially inwardly extending annular tongue attached to and coaxial with said annular vertical cylinder, said tongue having an upper surface and a lower surface and a plurality of circumferentially spaced threaded blind bores extending from said upper surface and from said lower surface of said tongue parallel to the central axis of said annular vertical cylinder, said outer member of each of said slewing rings having a plurality of circumferentially spaced through bores formed therein aligned with said threaded blind bores in said upper and lower surfaces of said tongue and threaded connecting bolts passing through said through bores in said outer member of each of said slewing rings into said threaded blind bores extending from said upper and lower surfaces of said tongue to secure said outer member of each of said slewing rings to said tongue and means for connecting said inner annular member of each of said slewing rings to another section of the vehicle to form a rotatable connection between said two adjacent sections of the vehicle.

2. An articulated joint as set forth in claim 1 wherein said inner annular member of each of said slewing rings has a plurality of circumferentially spaced threaded blind bores formed therein extending parallel to the central axis of said annular vertical cylinder, said means for connecting said inner annular member of each of said slewing rings to said another section of a vehicle includes spaced upper and lower rings attached to said another section of a vehicle, a plurality of circumferentially spaced through bores in said upper and lower rings having the same circumferential spacing as said threaded blind bores in said inner annular member of each of said slewing rings, and a plurality of threaded connecting bolts passing through said through bores in said upper and lower rings into said threaded blind bores in said inner annular member of each of said slewing rings to connect said inner annular member of said upper slewing ring to said upper ring on said another section of the vehicle and said inner annular member on said lower slewing ring to said lower ring on said another section of the vehicle.

3. An articulated joint as set forth in claim 2 including a lower annular flanged location sleeve located radially inwardly of said inner annular members of said upper and lower slewing rings, an upper annular flanged location sleeve located above said lower annular flanged location sleeve and the upper surface of said upper ring on said another section of the vehicle and means connecting said upper annular flanged location sleeve to said lower annular flanged location sleeve and to said inner member of said upper slewing ring.

4. An articulated joint as set forth in claim 3 including an annular shim located between said upper annular flanged location sleeve and said lower annular flanged location sleeve, whereby the thickness of said shim is selected to maintain the alignment of said slewing members to protect said bearing races.

5. In a vehicle having a first section and a second section the improvement comprising an articulated joint pivotally connecting said first section to said second section wherein said first section of the vehicle is formed as a male half of said articulated joint and said second section of said vehicle is formed as a female half of said articulated joint, said female half of said articulated joint being formed by two vertically spaced substantially parallel horizontally extending plates and said male half of said articulated joint being formed by two vertically spaced horizontally extending plates and an annular vertical cylinder extending between and connected to said spaced horizontally extending plates, said articulated joint including a first slewing ring and a second slewing ring, each of said slewing rings having an outer member and an inner member connected to said outer member and a bearing race located between said outer member and said inner member whereby said inner and outer members of each of said slewing rings are rotatable relative to each other, means for connecting said inner member of each of said slewing rings to said female half of said joint and means for connecting said outer member of each of said slewing rings to said male half of said joint to rotatably connect said sections of the vehicle, whereby said first section of the vehicle can pivot about a vertical axis relative to said second section of the vehicle.

6. In a vehicle as set forth in claim 5 including a lower L-shaped annular location sleeve located within said inner members of said slewing rings, said lower L-shaped annular location sleeve having an upper end and a lower outwardly extending radial lip, a circumferential recessed groove in the outer surface of said radial lip, circumferentially spaced through apertures extending from the base of said groove through said radial lip, threaded bolts having heads on one end extending through said through apertures in said radial lip, said bolt heads being located in said recessed groove so that said bolt heads do not project beyond the outer surface of said radial lip.

7. In a vehicle as set forth in claim 5 wherein said means for connecting said outer member of each of said slewing rings to said male half of said joint includes an annular vertical cylinder attached to said first section of said vehicle and a substantially horizontal inwardly extending radial tongue attached to the inner surface of said annular vertical cylinder, said tongue having upper and lower surfaces, a plurality of circumferentially spaced threaded blind bores extending from each surface of said substantially horizontal tongue parallel to the central axis of said annular vertical cylinder, said outer member of each of said slewing rings having a plurality of circumferentially spaced through bores formed therein aligned with said apertures in said substantially horizontal tongue and bolts passing through said through bores in said outer member Of each of said slewing rings and threaded into said threaded blind bores in said substantially horizontal tongue to connect said slewing rings to said substantially horizontal tongue.

8. In a vehicle as set forth in claim 7 wherein said inner member of each of said upper and lower slewing rings has a plurality of circumferentially spaced threaded blind bores formed therein, an annular lower flanged location sleeve located radially inwardly of said inner members of said slewing rings, a plurality of circumferentially spaced through bores in the lower portion of said lower flanged location sleeve having the same spacing as said blind bores in said inner member of said lower slewing ring, and a plurality of threaded bolts passing through said through bores in said lower flanged location sleeve into said threaded blind bores in said inner member of said lower slewing ring to connect said inner member of said lower slewing ring and said lower flanged location sleeve.

9. In a vehicle as set forth in claim 8 including an upper annular flanged location sleeve located within said inner member of said upper slewing member above the upper end of said lower L-shaped annular location sleeve.

10. In a vehicle as set forth in claim 9 wherein said lower L-shaped annular location sleeve has an upper end with a smaller diameter than said lower end of said lower L-shaped annular location sleeve and a plurality of circumferentially spaced threaded blind bores formed in said upper end of said lower L-shaped annular location sleeve, and means connecting said upper annular flanged location sleeve to said upper end of said lower L-shaped annular location sleeve.

11. In a vehicle as set forth in claim 10 including an annular shim between said upper annular flanged location sleeve and said upper end of said lower L-shaped annular spacer sleeve.

* * * * *